US006660081B2

(12) United States Patent
Cooper

(10) Patent No.: US 6,660,081 B2
(45) Date of Patent: Dec. 9, 2003

(54) SALT POULTICE

(76) Inventor: Barrie David Cooper, 62 Jacaranda Dr., Bass Hill, New South Wales, 2197 (AU)

( * ) Notice: Subject to any disclaimer, the term of this patent is extended or adjusted under 35 U.S.C. 154(b) by 0 days.

(21) Appl. No.: 10/353,980

(22) Filed: Jan. 30, 2003

(65) Prior Publication Data

US 2003/0136306 A1 Jul. 24, 2003

Related U.S. Application Data

(63) Continuation of application No. 09/700,542, filed as application No. PCT/AU99/00372 on May 18, 1999, now Pat. No. 6,544,329.

(30) Foreign Application Priority Data

May 18, 1998 (AU) .............................................. PP3554

(51) Int. Cl.[7] .............................................. C04B 14/26
(52) U.S. Cl. .................................. 106/817; 106/DIG. 2
(58) Field of Search ............................ 106/817, DIG. 2

(56) References Cited

U.S. PATENT DOCUMENTS 3,719,513 A * 3/1973 Bragg et al.
3,839,059 A * 10/1974 Rothfelder et al.
5,634,968 A * 6/1997 Pfaller et al.
5,782,961 A 7/1998 Karlsson ........................ 106/2
5,820,303 A 10/1998 Schneider ................... 405/267
6,544,329 B1 * 4/2003 Cooper

FOREIGN PATENT DOCUMENTS

ES 2085216 * 5/1996
PL 131996 * 1/1985

OTHER PUBLICATIONS

Derwent Abstract Accession No. 88–054362/08, J6 3011587 A (Mitsui Toatsu Chem Inc) Jan. 19, 1988.
Derwent Abstract Accession No. 89–357633/49, DE 3829328 (Ortleppw) Dec. 7, 1989.

* cited by examiner

Primary Examiner—Paul Marcantoni
(74) Attorney, Agent, or Firm—Kenyon & Kenyon

(57) ABSTRACT

The invention provides a poultice or sacrificial render comprising fibrous material and diatomaceous earth. Preferably, the ratio of fiber to diatomaceous earth is in the range 1:6 to 6:1 and the fibrous material contains relatively long fibers, such as would be obtained from the manufacturing or pulping of quality paper, for example fibers in the range 1 mm to 4 mm. The invention also provides a poultice mixture comprising fiber, diatomaceous earth and water and optional additives such as a binder or thickening agent and a biocide. The invention also provides a method of removing salt from a salt permeable object comprising the step of applying the poultice mixture to the salt permeable object.

23 Claims, 1 Drawing Sheet

SALT POULTICE

This is a continuation of application Ser. No. 09/700,542 filed Dec. 18, 2000 now U.S. Pat. No. 6,544,329 B1, which is a 371 of PCT/AU99/00372 filed May 18, 1999, the content of which is incorporated herein by references in its entirety.

TECHNICAL FIELD

The invention relates to the removal of salt from salt permeable objects, in particular stone and masonry walls.

BACKGROUND ART

The presence and movement of salt in stone and masonry is a major cause of decomposition of stone, brickwork and the like as well as plaster and other masonry coatings. The problem is particularly detrimental to stone walls. It is believed that mineral salts dissolved in water enter a stone wall at the bottom or on one face of the wall. Capillary action pulls the water through or up the wall, the driving force being the evaporation of water at a point remote from the entry point of the water. As the water evaporates, it leaves behind salts, which solidify at or near the surface. The salt crystals which form interfere with the structure of the masonry and lead to surface crumbling. As the outer layer of masonry crumbles away, more salt is drawn to the surface and so the crumbling continues.

The invention has been developed primarily for use in the field of building conservation and restoration and will generally be described hereinafter with reference to that purpose. However, it will be appreciated that the invention is not limited to this particular field of use.

One method of addressing this problem has been to transfer the point of deterioration caused by the salts by applying a poulticing plaster, or sacrificial rendering, to the stone wall to absorb salt from the stone and to provide a sacrificial surface which can be allowed to crumble without undue concern.

Sacrificial renders to date have suffered from a number of drawbacks. Generally, sacrificial renders which are sufficiently absorbent to remove salts and water from stone possess mechanical properties which mean they only last for a few weeks in areas of high salt contamination, disintegrating beyond a useful state in generally too short a time to completely remove salts from the wall. Also, unless stringent maintenance is observed, salts brought to the surface fall to the ground at the base of the wall during the exfoliation process, reverting to a saline solution on contact with ground water that is again drawn through the masonry by capillary action, thereby creating a continuous cycle.

Mechanically stronger renders tend to be less efficient at removing the salt from the wall. Another problem with such renders is that they tend to leave residual material on the stone when they are removed or eventually decompose. Examples of such renders are mixtures of fibreglass fibres with either a sand and lime, sand, cement and lime, or clay base. Attempts at using emulsified pulp alone have led to very unsatisfactory poultices, which shrink upon drying and do not adhere to the wall.

It is an object of the present invention to overcome or ameliorate one or more of the disadvantages of the prior art, or at least to provide a useful alternative.

SUMMARY OF THE INVENTION

According to a first aspect, the invention consists in a material for application to a salt permeable object to remove salt from that object, said material including a fluid permeable substrate and an agent for increasing the internal surface area of the material relative to the substrate alone.

In preferred embodiments, the invention is in the form of a poultice (or sacrificial render) with the agent for increasing the internal surface area being diatomaceous earth, and the substrate being cellulose fibres and the invention will be herein described with reference to that particular embodiment, although a skilled addressee would understand that other substrates and agents which increase the internal surface area of the poultice thereby increasing the capillary action of the poultice may also be used.

Preferably, the agent for increasing the internal surface area of the poultice is in a finely particulate form.

Commonly available diatomaceous earth may be used. Diatomaceous earth having particle sizes at the smaller end of the usual range (for example, around 3 $\mu$m) provides greater drawing power, however diatomaceous earth of a larger size (for example, up to 1 mm) is also satisfactory in poultices according to the present invention.

Perlite (a rhyolite glass) is another preferred agent which may be used in place of, or in addition to, diatomaceous earth. The agent used must also be inert to the masonry used.

Preferably, the fibrous material contains relatively long fibres, such as would be obtained from the manufacturing or pulping of quality paper, for example fibres in the range 1 mm to 4 mm with a weighted average of 2–3 mm. Without wishing to be bound by theory, it is believed that the individual fibres of the porous fibrous material are coated by diatomaceous earth particles. The two interact, dramatically increasing the capillary suction over either alone. The fibre thereby forms a very effective wick to transfer salt laden fluids away from the masonry, the process being driven by evaporation. Not only do the microscopic and submicroscopic properties of the mixture contribute to the overall function of the present invention, but the mechanical properties are desirable from the point of view of application and quick and clean removal from the masonry surface.

It has been found that a ratio of fibrous material to diatomaceous earth in the range 1:6 to 6:1 has given good results in for most applications. Where the poultice is to be applied to a curved surface, higher ratios of diatomaceous earth may be used to reduce delamination on drying. Where the poultice is to be applied to a flat surface, higher ratios of fibrous material may be used to assist removal from the surface when the poulticing is complete. Poultices with high ratios of fibrous material to diatomaceous earth (up to 6:1) can be subjected to a stronger pull when being removed from the wall and more conveniently come away in larger portions. For most applications, fibrous material to diatomaceous earth in ratios of between 1:2 and 2:1 are preferred, with 1:1 being more preferred.

In highly preferred embodiments, the poultice or sacrificial render contains a binding or thickening agent, such as a cellulose thickener, for example carboxymethyl cellulose.

The poultice or sacrificial render may also contain a biocide. Suitable biocides are those which are commercially available for use with pulps.

Desirably, the poultice or sacrificial render is, when dry, 4–5 mm in thickness.

In a second aspect, the invention also provides a mixture including a material according to the second aspect and water.

This mixture may also include a binder or thickening agent, such as a cellulose thickener, and a biocide. A pH adjusting substance, such as calcium carbonate, may also be added to adjust the pH to desirable levels, usually around pH 7.5.

In a third aspect, the invention provides a method of removing salt from a salt-permeable object including the steps of applying to the salt-permeable object a poultice, said poultice including a mixture of a fluid permeable substrate and an agent for increasing the internal surface area of the material relative to the substrate alone, and retaining said poultice on said surface for a time sufficient for salt to permeate from the salt permeable object into the poultice.

If desired, a fresh poultice may be reapplied after removal of the original poultice.

Preferably, the mixture is applied by means of spray, most preferably from a plastering pump, such as a positive displacement pump at a rate of around 3–5 kg per square meter.

It is preferable that the poultice mixture is applied wet to give a surface coating no more than 20 mm wet thickness and more preferably 8–10 mm wet thickness.

Again, without wishing to be bound by theory, the applicant believes that wet application, as well as providing the necessary adhesion to masonry surfaces activates the salts in the masonry wall and commences the poulticing procedure—in effect, the capillaries in the poulticing mixture are already primed by the presence of water. Thus, when evaporation commences at the surface, the salt laden water within the stone is already in fluid connection with the evaporating water at the surface of the poultice. The water in the mixture thus serves multiple purposes—it provides the material in a slurry form for application to an object, it acts as an adhesive to keep the poultice in place when wet, and it primes the capillaries and dissolves salts in the outer regions of the object, allowing the wicking process to begin.

BEST MODE FOR CARRYING OUT THE INVENTION

Figure 1:
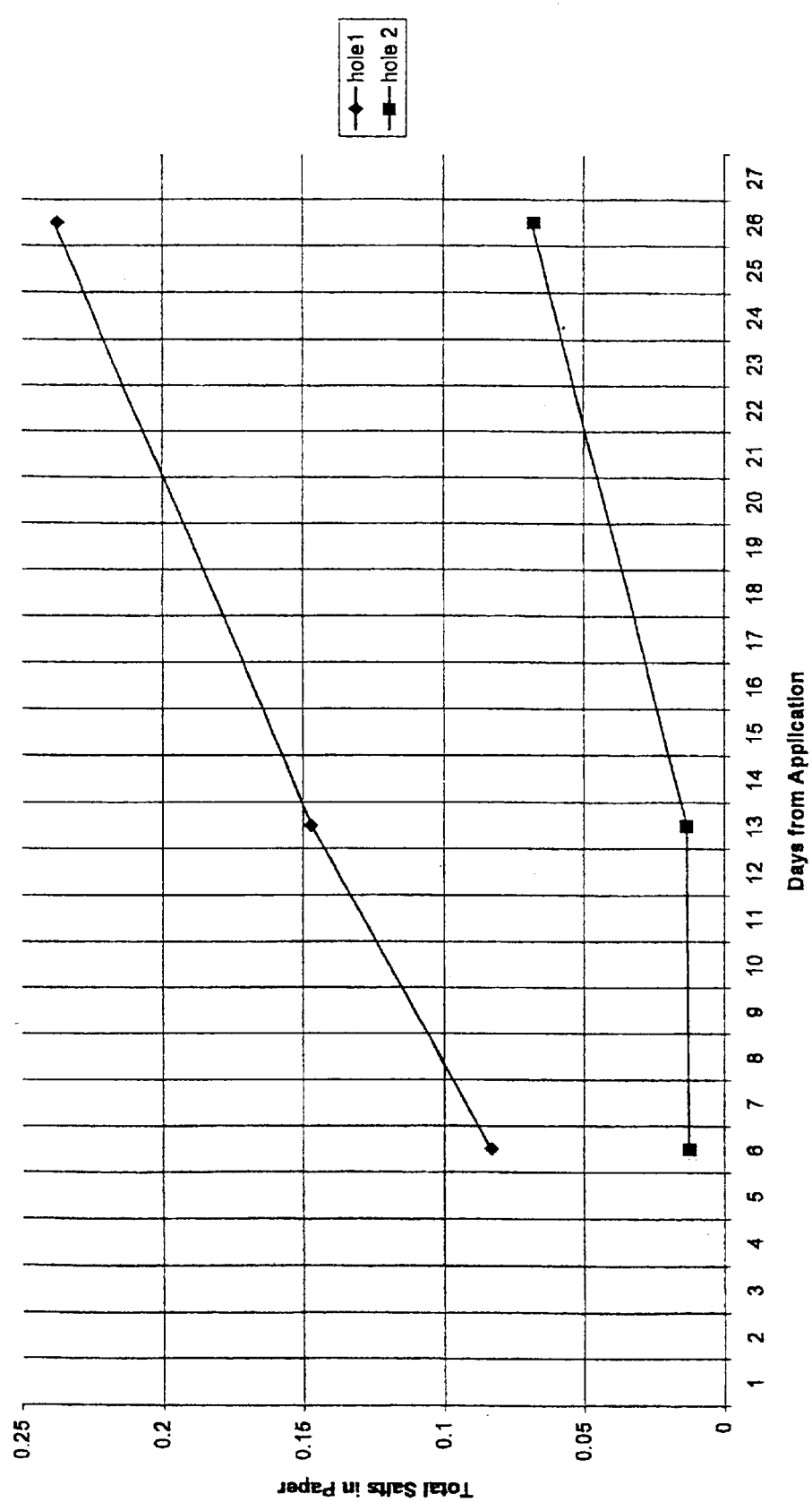
FIG. 1 shows the salt uptake of a sacrificial render according to the present invention against time for two different locations in a salt affected wall.

A preferred embodiment of the invention will now be described by way of example only.

EXAMPLE 1

Poultice Mixture

Virgin or repulped paper and diatomaceous earth are mixed in a 1:1 w/w ratio. Water is added until the total solids content is around 12.5%. For example, 125 kg of a 1:1 mixture of fibrous material is mixed with a quantity of water sufficient to give around 1000 liters of mixture. An effective amount of carboxymethyl cellulose thickener, 0.3 kg is added to thicken the mixture to an acceptable level for spraying through a positive displacement pump, to prevent the diatomaceous earth and pulp from settling prior to application, and to create a slight aeration of the mixture which results in a more effective sacrificial render. An effective amount (around 0.03 kg) of a biocide may also be added depending on when and where the mixture is to be used. Suitable biocides are those commercially available for use with paper pulps.

Calcium Carbonate may also be added to adjust the pH to around 7.5. Usually, around 3 Kg/1000 Kg batch of mixture is required.

In the present example, repulped filter papers were used, as these have long fibres and are generally free of contaminants. Recycled pulp may be used, although the use of such pulp is not recommended where contaminants such as ink are present, as these can affect the masonry.

EXAMPLE 2

Application

The poultice mixture from Example 1 can be applied with a plastering trowel or sprayed onto masonry through a positive displacement pump or a gravity feed hopper gun. It is applied on the surface to achieve a surface coating of about 8–10 mm. The poultice may be smoothed or textured as desired.

For curved surfaces, more diatomaceous earth is used, up to 6:1 relative to the amount of fibrous material, to prevent delamination as the poultice dries.

EXAMPLE 3

Drying

The poultice mixture applied in example 2 is allowed to dry. Under normal conditions, the poultice gives a dry sacrificial render in about 3–4 days. The sacrificial render adheres to the wall but shrinks to a thickness of 4–5 mm. If desired, the render may be removed by peeling off in large pieces. If the surface is flat, more fibrous material may be used, up to 6:1 relative to the amount of diatomaceous earth. This poultice can withstand a stronger pull and is more readily removed in larger pieces.

EXAMPLE 4

Salt Removal

The sacrificial render of example 3 becomes effective at removing salt from a wall as it dries. Efflorescence of salt crystals may be brushed or scraped periodically from the surface of the render and removed if desired, although this is not necessary. In normal use, after 3–4 weeks, up to around 85% of the salt will be removed from the wall, depending upon the exact situation, which may include such variables as the nature of the stone, the extent of salt contamination and the prevailing climatic conditions. The sacrificial render may be removed after this time, or left in place for ongoing protection of the wall.

EXAMPLE 5

Controlled Studies—Building I

Controlled studies were carried out on an internal salt contaminated harbourside wall which was more than 150 years old, where there was stone decay from both rising and falling damp.

Two test holes were drilled in a badly salt contaminated wall, one 490 mm above the floor and one 1480 mm above the floor. Samples were taken at a depth of 0–10 mm, 10–20 mm and 20–40 mm in each hole to determine the salt content of the sandstone. The coating was then applied to a thickness of 10 mm. The salt content of some unapplied poultice was also determined. After 2 weeks, the salt concentration of the sandstone and the poultice were remeasured.

The results are shown in Table 1.

TABLE 1

Initial condition of Sandstone Wall - Building I.

| Location | Ca % | K % | Mg % | Na % | Cl % | NO₃ % | SO₄ % |
|---|---|---|---|---|---|---|---|
| Hole 1 | | | | | | | |
| 0–10 mm | 0.150 | 0.030 | 0.015 | 0.965 | 1.060 | 0.090 | 0.920 |
| 10–20 mm | 0.040 | 0.030 | 0.005 | 0.515 | 0.485 | 0.060 | 0.450 |
| 20–40 mm | 0.010 | 0.025 | <0.005 | 0.415 | 0.445 | 0.040 | 0.230 |
| Hole 2 | | | | | | | |
| 0–10 mm | 0.200 | 0.035 | <0.005 | 0.600 | 0.345 | 0.085 | 1.020 |
| 10–20 mm | 0.045 | 0.020 | <0.005 | 0.120 | 0.090 | 0.020 | 0.055 |
| 20–40 mm | 0.025 | 0.025 | <0.005 | 0.250 | 0.020 | 0.015 | 0.195 |

The salt levels at 0–10 mm in the Number 2 Holes are high, mainly due to rising damp, but a component due to falling damp is also possible. Because of the marine environment, sodium chloride is the major contaminant. As expected, the total salt content is highest around 1.5 m above the floor, because this is where the rising water tends to dry out. It can be seen that there is significant salt contamination further back from the surface.

An analysis of the salts present in the unapplied poultice and those extracted from the applied poultice are shown in table 2.

TABLE 2

Poultice Salts - Building I

| Sample | Ca % | K % | Mg % | Na % | Cl % | NO₃ % | SO₄ % |
|---|---|---|---|---|---|---|---|
| Unapplied Poultice | 0.140 | <0.005 | 0.010 | 0.025 | 0.085 | 0.015 | 0.040 |
| Applied Poultice Week 1 | | | | | | | |
| Hole 1 (N) | 0.225 | 0.020 | 0.015 | 2.735 | 4.890 | 0.010 | 0.355 |
| Hole 2 (N) | 0.025 | 0.015 | <0.005 | 0.415 | 0.270 | 0.055 | 0.375 |
| Applied Poultice Week 2 | | | | | | | |
| Hole 1 (S) | 0.070 | 0.080 | 0.010 | 5.325 | 6.985 | 0.375 | 1.830 |
| Hole 2 (S) | 0.020 | 0.020 | <0.005 | 0.480 | 0.380 | 0.085 | 0.290 |

Initially, the poultice had a total soluble salt content of 0.32%. This was mainly due to the presence of added calcium carbonate, which was added to the mix to produce an alkaline condition. The other contaminants are probably due to the presence of materials from the tap water used.

It can be seen that an appreciable amount of salts were transferred into the poultice after just two weeks. The total transfer at No 1 holes were particularly high, and rose from 8.3% after 6 days to 14.7% after 13 days.

EXTENDED TRIAL

The performance of the coating in absorbing salt is shown in the table below.

TABLE 3

Total Salt in Poultice - Building I

| Total Salts | 6 Days | 13 days | 26 Days |
|---|---|---|---|
| Location 1 | 8.3% | 14.7% | 23.7% |
| Location 2 | 1.2% | 1.3% | 6.8% |

TABLE 4

Salt in Stone - Building I

| Total Salts | | Initial % | 26 Days % |
|---|---|---|---|
| Hole No 1 | 0–10 mm | 3.2 | 1.6 |
| | 10–20 mm | 1.6 | 0.7 |
| | 20–40 mm | 1.2 | 0.6 |
| Hole No 2 | 0–10 mm | 2.3 | 0.3 |
| | 10–20 mm | 0.4 | 0.2 |
| | 20–40 mm | 0.5 | 0.17 |

It can be seen that in some places, a reduction of 87% of the salts has occurred, with reductions of 50% or greater being common. Graphing the data also shows that the rate of salt uptake by the poultice has not slowed greatly over this period. See FIG. 1.

INSPECTION OF THE RENDER AFTER EXTENDED USE

After 26 days, the poultice showed no signs of cracking or other damage. The deposition of salt crystals on the surface was also noticeable.

EXAMPLE 6

Building II

Further tests were carried out on an exposed stone wall located several hundred meters from the ocean. The total salt concentration of the stone at two different locations and varying depths was monitored subsequent to the application of the poultice in February. At both locations it can be seen that the application of the poultice reduced the total soluble salt content of the stone at all depths in a relatively short period.

TABLE 5

Salt in Stone - Building II
Total Soluble Salt Content (% by wt.)

| Hole | Hole No. 1 | | | Hole No. 2 (L.H.S. of Building) (R.H.S. of Building) | | |
|---|---|---|---|---|---|---|
| Depth | Feb | Mar | April | Feb | Mar | April |
| 0–10 mm | 0.94 | 0.88 | 0.27 | 0.66 | 0.25 | 0.11 |
| 10–20 | 0.11 | — | 0.04 | 0.07 | — | 0.04 |
| 20–40 | 0.05 | — | 0.03 | 0.08 | — | 0.04 |

The results of the analysis of the extractable salts from Building II present in the samples are shown in table 6.

TABLE 6

Poultice Salts - Building II

| Sample | Ca % | K % | Mg % | Na % | Cl % | NO₃ % | SO₄ % |
|---|---|---|---|---|---|---|---|
| LHS | | | | | | | |
| 0–10 | 0.025 | 0.020 | 0.030 | 0.020 | 0.020 | <0.005 | 0.150 |
| 10–20 | <0.005 | 0.020 | <0.005 | <0.005 | <0.005 | <0.005 | <0.005 |
| 20–40 | <0.005 | 0.015 | <0.005 | <0.005 | <0.005 | <0.005 | <0.005 |
| RHS | | | | | | | |
| 0–10 | 0.025 | 0.020 | 0.030 | 0.010 | <0.005 | <0.005 | 0.015 |
| 10–20 | <0.005 | 0.020 | <0.005 | <0.005 | <0.005 | <0.005 | <0.005 |
| 20–40 | <0.005 | 0.020 | <0.005 | <0.005 | <0.005 | <0.005 | <0.005 |

EXAMPLE 7

Building III

The results of the salt determinations obtained from drillings taken in the cornices of a stone building located in a polluted environment a few kilometers from the sea are shown in table 7.

A series of holes were drilled and samples of salt concentration were taken at depths of 0–10, 10–20, 20–40, 80–100, and 150–170 mm. In addition, samples were taken from the loose debris on the weathered surface.

TABLE 7

Initial Total Soluble Salt Content [% by weight] - Building III

|  | S22 | S35 |
|---|---|---|
| Weathered Surface | 0.89 | — |
| 0–10 mm | 1.28 | 0.93 |
| 10–20 mm | 0.58 | 0.59 |
| 20–40 mm | 0.21 | 0.53 |
| 80–100 mm | 0.09 | 0.24 |
| 150–170 mm | 0.10 | 0.21 |

As is typical of salt contamination in cornice soffits, most of the salts are concentrated close to the surface and diminish with increasing depth.

The poultice was applied as above for a period of 4.5 weeks. The poultices were removed and the salt content analysed. The results in table 8 show a significant amount of salt has been transferred to the two poultices at S22 and S35.

TABLE 8

Salt in Poultices, Building III

| Location | Total Salts [% by wt.] |
|---|---|
| S22 | |
| No. 1, Back | 1.77 |
| No. 1, Front | 1.35 |
| No. 2, Front | 0.88 |
| S35 | |
| No. 1, Back | 0.53 |
| No. 1, Front | 1.25 |
| No. 2, Front | 1.17 |

The salt transfer shown in table 8 is consistent with the salts in the original stone drillings. The main salts transferred were sulphates, mostly magnesium and then calcium. Some chlorides and nitrates present in smaller quantities in the stone were also transferred into the poultice.

The results of the analysis of the extractable salts present in the poultice samples are shown in table 9.

TABLE 9

Poultice Salts, Building III.

| Sample | Ca % | K % | Mg % | Na % | Cl % | NO$_3$ % | SO$_4$ % |
|---|---|---|---|---|---|---|---|
| S22 | | | | | | | |
| North Back 1 | 0.130 | 0.005 | 0.305 | 0.030 | 0.175 | 0.125 | 1.000 |
| North Front 1 | 0.095 | <0.005 | 0.245 | 0.020 | 0.090 | 0.055 | 0.845 |
| 11/1 2 | 0.130 | 0.005 | 0.110 | 0.020 | 0.090 | 0.050 | 0.470 |
| S35 | | | | | | | |
| South Back 1 | 0.110 | <0.005 | 0.050 | 0.035 | 0.165 | 0.050 | 0.120 |
| South Front 1 | 0.115 | 0.005 | 0.205 | 0.030 | 0.180 | 0.055 | 0.660 |
| 11/1 2 | 0.105 | <0.005 | 0.195 | 0.020 | 0.125 | 0.035 | 0.685 |

The total soluble salt contents for the 2 sets of drillings are shown in table 10.

TABLE 10

Salt in Stone - Building III

|  | S22 | | S35 | |
|---|---|---|---|---|
|  | Dec | Jan | Dec | Jan |
| 0–10 mm | 1.28 | 1.21 | 0.93 | 0.69 |
| 10–20 mm | 0.58 | 0.27 | 0.59 | 0.55 |
| 20–40 mm | 0.21 | 0.11 | 0.53 | 0.47 |

Comparisons between the two sets of results taken before the application of the poultice and after 4.5 weeks of poulticing show that reductions occurred with all 6 samples. The most appreciable reductions occurred at S22 at 10–20 mm and 20–40 mm and at 0–10 mm for S35.

The analysis of poultice salts for building III is shown in Table 11. Previously the major contaminant was magnesium sulphate. The current results for S22 show that most of the magnesium has been removed. It was also reduced at 0–10 mm in S35 but to a lesser extent. However at 0–10 mm for S22, calcium sulphate has now become the major sulphate and the sulphate levels deeper in the stone are now small. This suggests that the poultice is functioning below the surface and is drawing salts down from deeper in the stone.

TABLE 11

Poultice Salts, Building III

| Sample | Ca % | K % | Mg % | Na % | Cl % | NO$_3$ % | SO$_4$ % |
|---|---|---|---|---|---|---|---|
| S22 | | | | | | | |
| 0–10 | 0.265 | 0.025 | 0.060 | 0.015 | 0.025 | 0.045 | 0.775 |
| 10–20 | 0.025 | 0.045 | 0.025 | 0.015 | 0.015 | 0.020 | 0.120 |
| 20–40 | <0.005 | 0.025 | 0.010 | 0.015 | 0.010 | 0.015 | 0.035 |
| S35 | | | | | | | |
| 0–10 | 0.020 | 0.030 | 0.130 | 0.010 | 0.030 | 0.015 | 0.450 |
| 10–20 | 0.025 | 0.035 | 0.095 | 0.015 | 0.040 | 0.015 | 0.320 |
| 20–40 | 0.025 | 0.035 | 0.075 | 0.020 | 0.035 | 0.015 | 0.260 |

EXAMPLE 8

Building IV

Building IV was an old stone building in a marine environment. As expected, sodium chloride was the main contaminant, but there was also a significant amount of sulphates present and a little nitrate.

'Before' and 'after' salt determinations of the poulticed stone were not carried out, however the poultice was applied in a manner similar to that described above for a number of weeks. The total soluble salt content of the poultice after removal was 6.89%, which was quite high. It was not determined whether there was still appreciable salt contamination left in the stone.

The results of the analysis of the extractable salts present in the sample are shown in Table 12.

TABLE 12

Poultice Salts, Building IV

| | Ca % | K % | Mg % | Na % | Cl % | NO$_3$ % | SO$_4$ % |
|---|---|---|---|---|---|---|---|
| Sample | 0.055 | 0.225 | 0.080 | 2.185 | 2.215 | 0.250 | 1.875 |

Although the invention has been described with reference to a specific example, it will be appreciated by those skilled in the art that the invention may be embodied in many other forms.

The claims of the invention are as follows:

1. A material for forming a poultice or sacrificial render, comprising:
   a fluid permeable substrate comprising cellulose fibres; and
   an agent for increasing the internal surface area of the poultice or sacrificial render relative to the substrate alone, said agent comprising an agent selected from diatomaceous earth or perlite.

2. A material according to claim 1 wherein the length of the fibres is between 1 and 4 mm.

3. A material according to claim 2 wherein the length of the fibres has an average of 2.5 mm.

4. A material according to claim 1 wherein the fibrous substrate is obtained from the manufacturing and/or pulping of paper.

5. A material according to claim 1 wherein the agent is in a finely particulate form.

6. A material according to claim 1 wherein the ratio of substrate to agent is in the range 1:6 to 6:1.

7. A material according to claim 6 wherein the ratio of substrate to agent is in the range 1:2 to 2:1.

8. A material according to claim 7 wherein the ratio of substrate to agent is 1:1.

9. A material according to claim 1 further including a binding or thickening agent.

10. A material according to claim 9 wherein the binding or thickening agent is a cellulose thickener.

11. A material according to claim 10 wherein the cellulose thickener is carboxymethyl cellulose.

12. A material according to claim 1 further including a biocide.

13. A material according to claim 1 being 4–5 mm in thickness when dry.

14. A mixture or forming a poultice or sacrificial render, comprising:
    a fluid permeable substrate comprising cellulose fibres;
    an agent for increasing the internal surface area of the poultice or sacrificial render relative to the substrate alone, said agent comprising an agent selected from diatomaceous earth or perlite; and
    water.

15. A mixture according to claim 14 wherein substrate and agent are present in an amount of about 12.5% by weight of the mixture.

16. A mixture according to claim 14 wherein water is present in an amount of about 87% by weight of the mixture.

17. A mixture according to claim 14 further including a pH adjusting agent.

18. A mixture according to claim 17 wherein the pH adjusting agent is calcium carbonate.

19. A mixture according to claim 17 wherein calcium carbonate is present in an amount adjust pH to 7.5.

20. A material according to claim 1 further including a pH adjusting agent.

21. A material according to claim 20 wherein the pH adjusting agent is calcium carbonate.

22. A material according to claim 1 wherein calcium carbonate is present in an amount to adjust pH to 7.5.

23. A material for forming a poultice or sacrificial render, comprising:
    cellulose fibres;
    an agent including at least one of diatomaceous earth and perlite;
    a cellulose thickener; and
    a pH adjusting substance including calcium carbonate,
    wherein the ratio of the cellulose to the agent is at least 1:1, the ratio of the cellulose and agent to the thickener is at least 125:0.3, and the ratio of the cellulose and agent to the pH adjusting substance is at least 125:0.375.

* * * * *

UNITED STATES PATENT AND TRADEMARK OFFICE
CERTIFICATE OF CORRECTION

PATENT NO. : 6,660,081 B2
DATED : December 9, 2003
INVENTOR(S) : Barrie David Cooper It is certified that error appears in the above-identified patent and that said Letters Patent is hereby corrected as shown below:

Column 10,
Line 5, change "A mixture or forming" to -- A mixture for forming --.

Signed and Sealed this

Seventh Day of June, 2005

JON W. DUDAS
*Director of the United States Patent and Trademark Office*